Oct. 23, 1962    M. B. SLEEPER    3,059,744
HYDRAULIC VARIABLE SPEED DRIVE
Filed Nov. 13, 1959    3 Sheets-Sheet 1

Inventor:
Murrel B. Sleeper.
By Stiee & Stiee
Attys

Oct. 23, 1962  M. B. SLEEPER  3,059,744
HYDRAULIC VARIABLE SPEED DRIVE
Filed Nov. 13, 1959  3 Sheets-Sheet 2

Inventor:
Murrel B. Sleeper.

Oct. 23, 1962  M. B. SLEEPER  3,059,744
HYDRAULIC VARIABLE SPEED DRIVE
Filed Nov. 13, 1959  3 Sheets-Sheet 3

Inventor.
Murrel B. Sleeper.
By Lee & Lee
Attys.

United States Patent Office 3,059,744
Patented Oct. 23, 1962

3,059,744
HYDRAULIC VARIABLE SPEED DRIVE
Murrel B. Sleeper, Sturgis, Mich., assignor to Gerbing Manufacturing Company, Elgin, Ill., a corporation of Illinois
Filed Nov. 13, 1959, Ser. No. 852,793
7 Claims. (Cl. 192—58)

The present invention relates to a hydraulic variable speed drive, and has as one important object thereof the provision of a drive construction which maintains a predetermined speed ratio between driven and driving members without substantial fluctuation.

Another object is the provision of a variable speed drive construction in which fine and accurate adjustment of the ratio of driving to driven speeds is accomplished.

Another object is the provision of a variable speed drive mechanism instantly self-adjusting in response to variations in the speed of the driven member to bring the member to a predetermined speed.

A further object is the provision of a variable speed drive which is equally positive and efficient in either direction of rotation.

It is also an object of the invention to provide a variable speed drive with simple control mechanism by which the speed may be adjusted or changed while the drive construction is in operation, as well as when it is idle.

A further object of the invention is the provision of a variable speed drive construction which is self-lubricating, and requires a minimum of fluid seals, particularly high pressure seals.

Still another object of the invention is the provision of a variable speed drive construction of substantially constant power characteristics and a continuously variable range.

Other objects of the invention, together with the various advantages and features thereof, will become apparent to those skilled in the art from the following detailed description, taken in conjunction with the accompanying drawings, in which.

Figure 1:
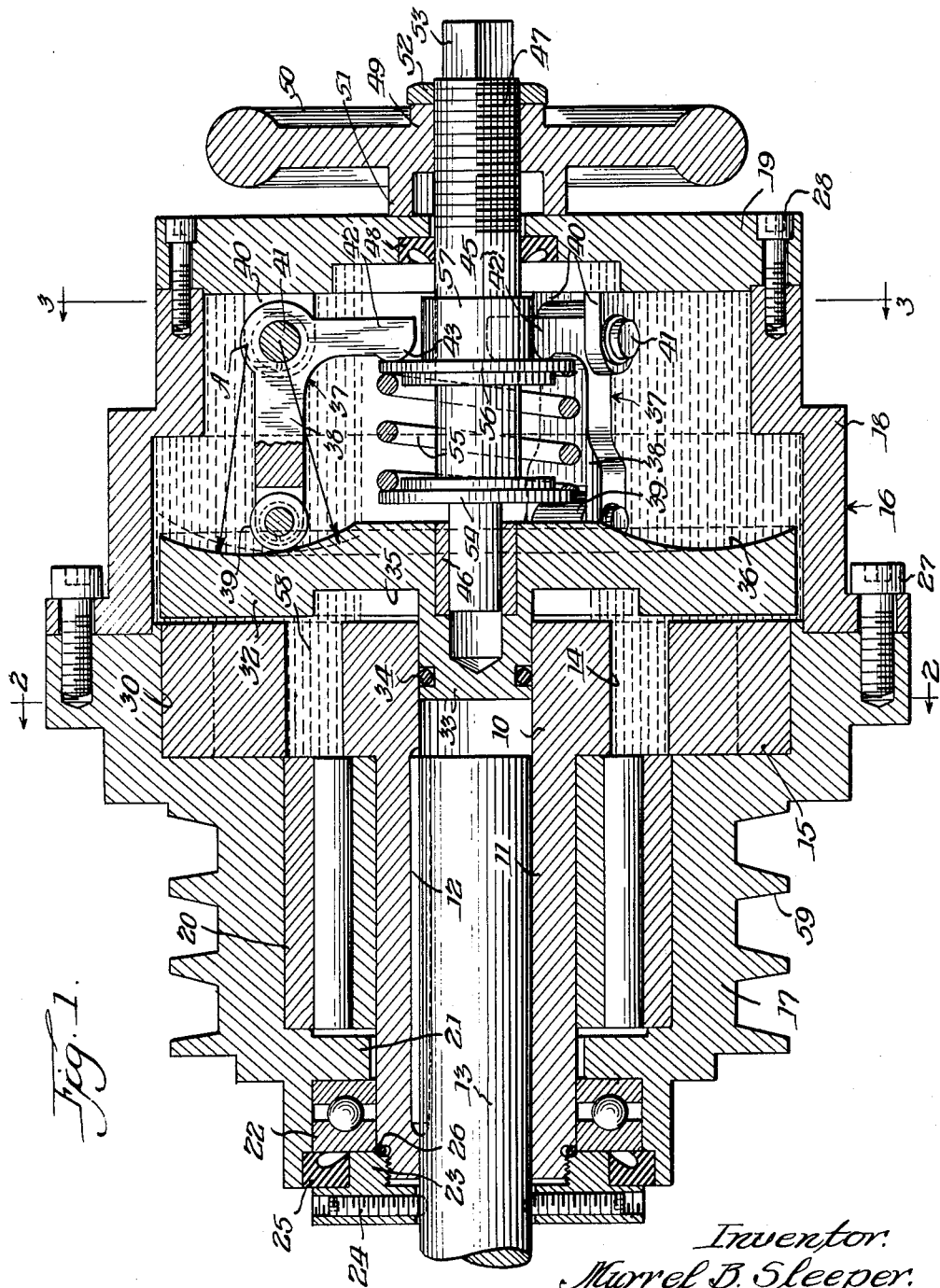
FIG. 1 is a longitudinal section view through one embodiment of the invention.

Referring to the drawings, there is shown an impeller or rotor 10 with an axially extended hub 11 secured by a key 12 or the like to a drive shaft 13 for rotation therewith. The rotor is cylindrical in form, and has a number of slots 14 formed extending radially inwardly from its periphery and in the present instance extending from one end face to the other thereof. Four such slots 14 are shown, equally spaced about the circumference of the rotor, although six or some other number may be employed. In each of the slots is slidably disposed a vane 15 which preferably is of a radial length less than the depth of the slot in which it is received, so that when its radially outer edge is substantially flush with the peripheral surface of the rotor, its inner edge is spaced slightly from the bottom of the slot, as will be evident from FIGS. 2 and 4.

The rotor is enclosed in a hollow driven member or housing generally indicated at 16 and comprising in this case a pulley portion 17, a reservoir portion 18, and a cap plate 19 closing the end of the reservoir portion. The pulley portion 17 is rotatably mounted on the drive shaft 13 by suitable means such as roller bearings 20 disposed between the rotor hub 11 and the interior of the pulley portion. The bearings 20 extend between the rotor 10 and an internal flange 21 of the pulley portion 17, which flange engages a thrust bearing 22 which lies between the flange 21 and a lock nut 23 which is threaded on the end of the rotor hub 11 and secured against movement relative to the drive shaft 13 by suitable set screws 24. The nut 23 is suitably formed to define with the adjacent end of the housing portion 17 an annular chamber or groove receiving an oil seal 25 of any appropriate form to prevent leakage of liquid between the housing and nut. An O-ring 26 or other suitable seal is provided about the end of the rotor hub 11 to prevent leakage between the hub and the nut 23. The reservoir portion 18 of the housing has a flange at one end thereof by which it is secured to the end of the pulley portion 17 opposite that in which the thrust bearing 22 is disposed. Socket bolts 27 or like securing means may be employed for attaching the portion 18 to the portion 17. The cap plate 19 is secured to the other end of the portion 18 in any suitable manner, as by the use of bolts 28 as shown. The housing 16 is preferably of circular section and coaxial with the drive shaft 13.

Figure 2:
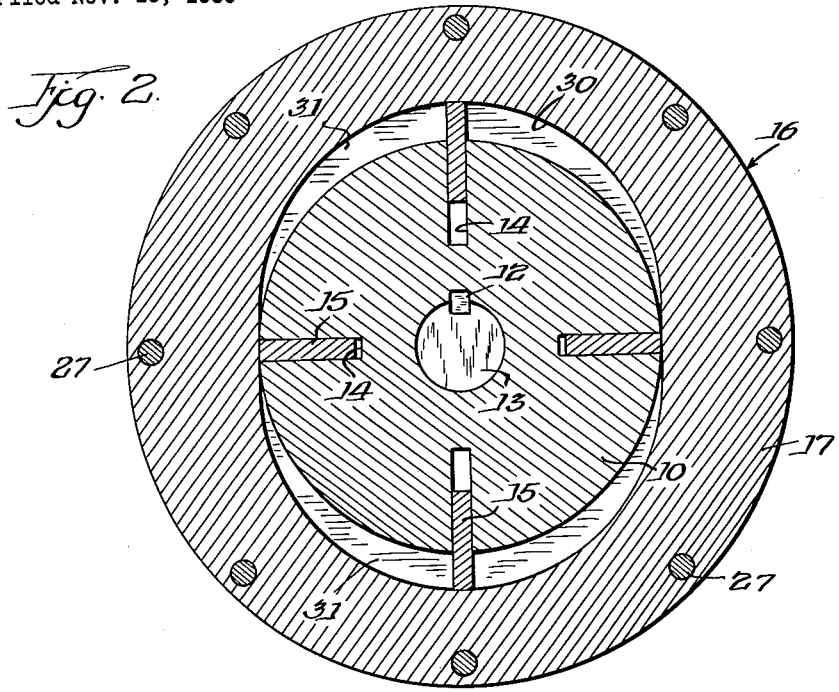
FIG. 2 is a cross sectional view taken substantially as indicated by the line 2—2 of FIG. 1.
Figure 3:
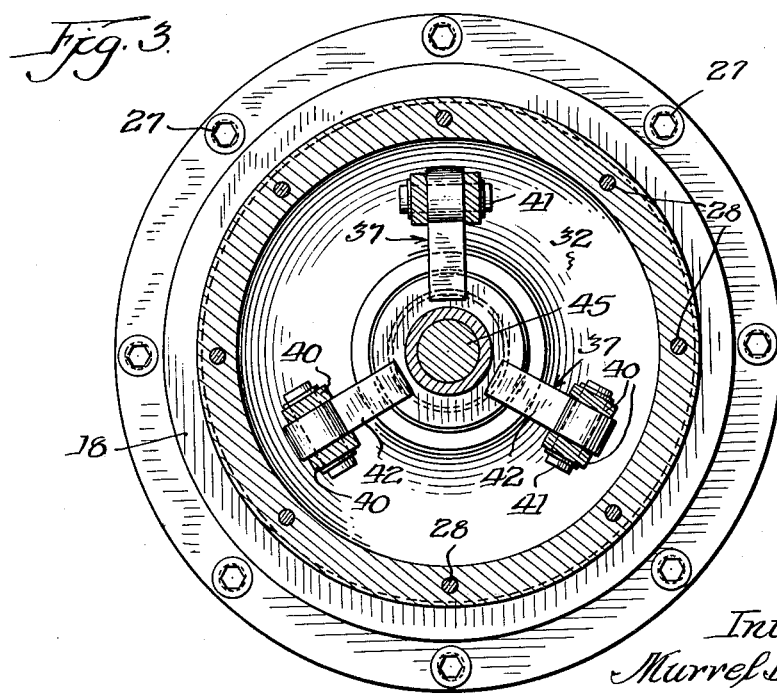
FIG. 3 is a cross section taken approximately on the line 3—3 of FIG. 1.

At the end of the pulley portion 17 of the housing adjacent the reservoir portion 18 there is formed a chamber 30, one side of which is open to the reservoir portion, and which receives therein the rotor 10. The axial depth of the chamber 30 in the embodiment illustrated is the same as the length or axial dimension of the rotor 10 proper, and as best shown in FIG. 2 is of generally elliptical shape. Likewise, in the present instance, the diameter of the rotor is equal to what may be termed the minor axis of the chamber 30 so that the rotor extends thereacross and divides the chamber into two substantially crescent-shaped pockets 31.

It will be evident that the sliding relation of the vanes 15 in the slots 14 results in their being projected radially outwardly of the slots by centrifugal force when the rotor is rotated, so that their outer edges are in contact with the peripheral wall of the chamber 30 as they rotate with the rotor, the vanes being forced completely into the slots as they come to the narrowest portion of the chamber and reaching their greatest projection outwardly of the slots as they reach what may be termed the major axis of the chamber. In some cases, it may be desirable to provide resilient means such as suitable springs which urge the vanes outwardly.

An adjustment plate 32, in this case shown as circular, is mounted adjacent the end face of the rotor 10 which lies at the open side of the chamber 30. The edge of plate 32 is in clearance relation with the interior of the housing portion 18 so as to allow passage of liquid therebetween, but the diameter of the plate is greater than the length of the major axis of the chamber 30 so that the open side of the chamber may be closed by the adjustment plate upon movement of the latter in the direction of the rotor. The plate 32 has a pilot bearing portion 33 received in slidable and rotatable relation within an extension of the hub opening of the rotor, and carries an O-ring 34 engaging with the rotor to prevent leakage between the parts.

The plate 32, adjacent the rotor 10, is provided with annular recess 35 about the portion 33 of a width sufficient to communicate with the bottom portions of the slots 14, so that all the slots are in communication with each other. The other face of the plate 32 is formed with an annular recess 36 therein, coaxial with the rotor 10 and drive shaft 13, the bottom of which is arcuate in cross section. The axis of generation of the bottom surface of the depression 36 is a circle centered on the housing axis and spaced from the depression surface by any appropriate distance or radius R illustrated in FIG. 1. The plate 32 may be moved toward the rotor 10 by means of a plurality of bell cranks 37, preferably at least three in number, each of which has a bifurcated arm 38 in which is journaled a roller 39 adapted to bear on the surface of the depression 36. The bell cranks 37 are suitably pivoted in the housing in any desired manner, as by pairs of ears 40 projecting inwardly from the cap plate 19 serving as pivot brackets carrying the pivots 41 of the bell cranks 37. The pivots of the bell cranks 37 are located in spaced relation along a circle concentric with the generating axis of the surface of the depression 36, and thus coaxial with the drive shaft and depression 36, but of smaller radius so that the bell crank pivots are disposed radially inwardly of the axis of generation of the bottom of the annular depression 36. The radius of each bell crank, that is, the distance from the pivot axis to the outermost point of the roller 39, in the embodiment illustrated, is shown as equal to the radius of the arcuate bottom of depression 36, though it need not be the same. The arc described by the outermost portion of the roller 39 of each bell crank is shown in broken lines in FIG. 1, and it will be seen that it intersects the arc of the depression bottom. This obviously is due to the radially inwardly offset or spaced relation of the bell crank pivot axis relative to the generating axis of the depression surface.

It will be apparent from FIG. 1 that if the bell cranks 37 are swung about their pivots so that the rollers move radially inwardly, the plate 32 will be moved axially toward the rotor 10 by reason of the camming engagement of the rollers 39 with the bottom surface of the annular depression 36. Similarly, if the rollers are moved in the opposite direction, they allow movement of the plate 32 in the direction away from the rotor 10. The bell cranks are biased to swing the rollers 39 on the arms 38 radially inwardly by means of their respective arms 42 extending radially inwardly at approximately right angles to their associated arms 38, the arms 42 thus being normally urged to swing in a direction away from the rotor 10 and toward the adjacent cap plate 19.

The mechanism by which the bell cranks are biased in the manner described may comprise a control shaft 45, coaxial with the drive shaft, which has a reduced end portion slidably received in a bushing 46 disposed in a suitable bore formed in the adjustment plate 32. The other end of the control shaft 45 extends outwardly through a central aperture in the cap plate 19 and in the embodiment illustrated has its projecting portion threaded as at 47. An annular sealing member 48 of any appropriate type is provided on the control shaft at the aperture in the plate 19 to seal against leakage therethrough. Threadedly engaged on the outwardly projecting end portion of the control shaft is a nut member which is illustrated on the form of the hub 49 of a hand wheel 50, and has an axially extending flange 51, the edge of which bears against the outer surface of the plate 19. It will be clear that rotation of the handwheel 50 in one direction will draw the control shaft 45 outwardly, while rotation in the other direction will permit the shaft to be drawn inwardly. A lock nut 52 may be employed on the threaded end portion of the control shaft to guard against the possibility of undesired relative rotation of the handwheel and shaft, which would result in unintended changing of the adjusted relation thereof. The extremity of the control shaft may be squared as shown at 53 or otherwise suitably formed for engagement with a tool to facilitate manipulation of the handwheel and lock nut relative to the shaft.

Threaded or otherwise suitably secured on the control shaft 45 adjacent the reduced inner end portion thereof is a stepped disc 54 comprising a fixed spring seat receiving one end of a compression spring 55 coiled about the shaft 45. The other end of the spring 55 engages on a spring seat 56 similar to the seat 54 but slidably disposed on the control shaft by means of a hub or sleeve 57 to which it is secured and which is engaged on the shaft 45 in axially movable relation. The slidable spring seat 56 engages against the rounded end portions 43 of the arms 42 of the bell cranks 37, which are thus subjected to the force of the spring 55 so as to be resiliently urged to swing about their pivots 41 in a direction away from the adjustment plate 32 and rotor 10. It will be apparent that the force exerted by the spring is determined by the degree of compression thereof between the seats 54 and 56, which is controlled by the axial adjustment of shaft 45.

Within the chamber 30, filling the pockets 31 and the slots 14, and also in the reservoir housing portion 18, is a quantity of oil 58 which serves to lubricate the parts within the housing 16, but has a more important function which will appear hereinafter.

Formed or secured on the housing portion 17 is a multiple groove pulley 59 which by means of suitable V-belts (not shown) will transmit the rotation of the drive shaft 13 and housing 16 to any desired mechanism. Obviously, other means than the pulley 59 might be employed for this purpose, as for example, a gear.

The operation of the drive construction just described is simple, efficient, and reliable. From FIGS. 1 and 2, it will be evident that if the plate 32 is moved so as to close the open side of the chamber 30, oil will be trapped in the pockets 31. These pockets, because of their crescent shape, are of decreasing cross section in either direction or rotation of the rotor 10, and accordingly the liquid trapped therein, being substantially incompressible, serves to lock the rotor 10 and the pulley portion 17 together, since the rotor vanes 15 projecting into the pockets 31 are held against movement relative to the housing 16 by the liquid. The housing 16 thus rotates in the same direction and at the same speed as the drive shaft 13. It is not necessary to the invention that the rotor 10 itself divide the chamber 30 into the pockets 31, since the width of the chamber may be greater than the rotor diameter, so long as pockets are defined therein, as by the vanes 15, of decreasing cross section in the direction of rotation. The driven member or housing 16 may be selectively adjusted to rotate at any desired speed relative to the shaft 13 not greater than the shaft speed by adjustment of the bell crank control mechanism.

The compression of spring 55 is determined so as to hold the plate 32 in a chamber-closing position when the drive is idle, but to be overcome at a predetermined speed by the centrifugal force which moves the bell crank arms 38 and rollers 39 radially outwardly so that the plate 32 is moved away from its closed position by the pressure of the oil in the pockets 31. The positions to which the rollers 39 move, and hence the distance by which the plate 32 is separated from the adjacent face of the rotor 10, are determined by the speed of rotation of the housing 16 or in other words the spinning speed of the bell cranks 37, and the pressure applied to the crank arms 42 by the spring 55. For any given rotational speed of the driven member or housing 16, the position of the rollers 39 along their arcs of swing and thus the position of the plate 32 relative to the rotor 10 may be determined by any desired location by adjusting or controlling the compression of the spring 55. In other words, the opposing forces acting on the rollers 39 to move them radially outwardly and to move them radially inwardly may be balanced at any desired position. With the bell cranks 37 moved to a position such as that shown in FIGS. 1 and 4, to locate the adjustment plate 32 in a position spaced only slightly from the adjacent face of the rotor 10, the housing 16 and therefore the pulley 59 thereon will rotate at a somewhat slower rate than the drive shaft 13, since the oil in the pockets 31 in advance of the vanes 15, though under pressure, is not completely trapped but may escape through the open side of the chamber 30 and about the ends of the vanes adjacent the plate 32 into the space between the rotor 10 and the adjustment plate. Due to the restricted nature of the space between the parts, however, the rate of escape of the oil is relatively slow and the oil under pressure in the pockets 31 provides a partial lock or coupling between the rotor 10 and the housing 16. Positioning of the bell crank rollers 39 radially inwardly of the FIG. 1 position will of course bring the plate 32 to a position closing the chamber 20 for driving the housing 16 at the full drive shaft speed.

Figure 4:
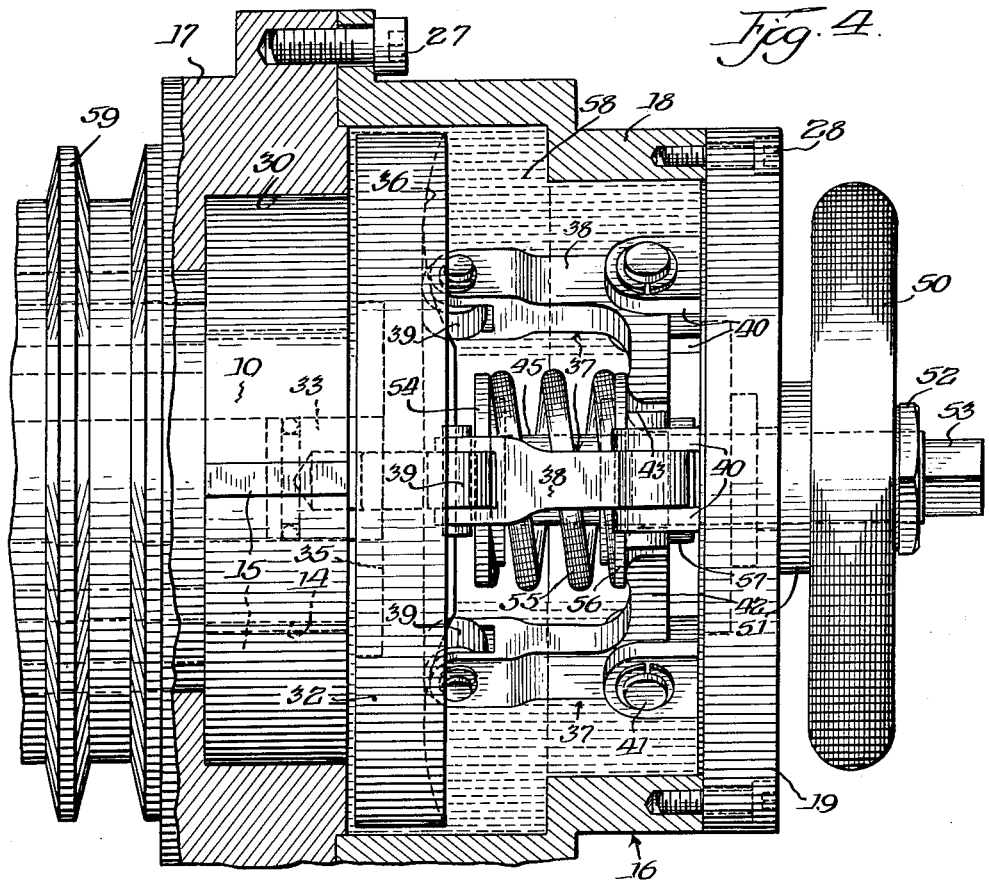
FIG. 4 is an elevational view looking in a direction substantially normal to the plane of FIG. 1, with a portion of the driven member broken away.
Figure 5:
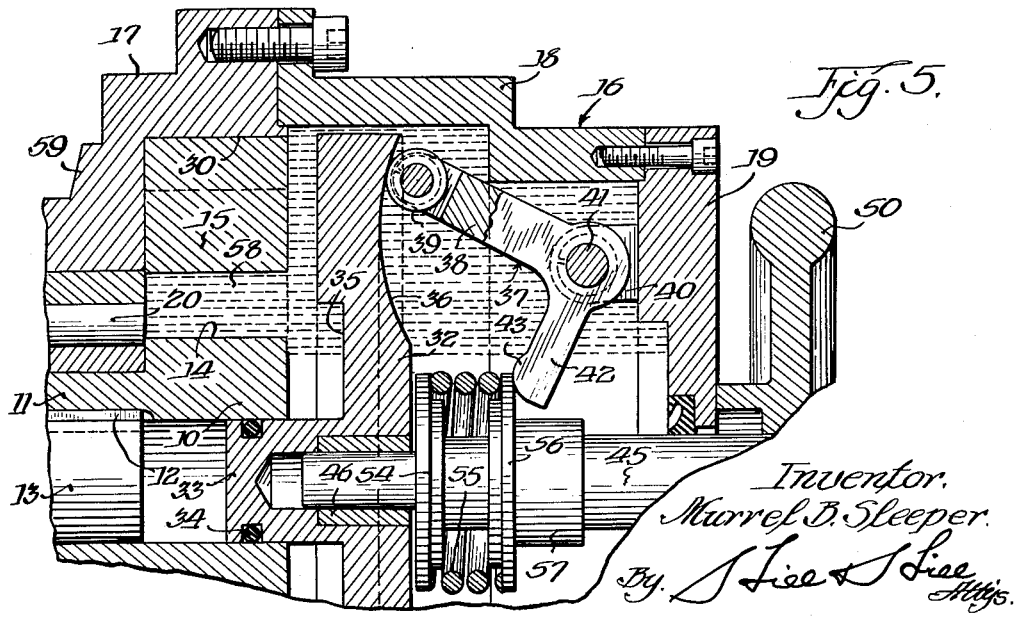
FIG. 5 is a fragmentary sectional view similar to a portion of FIG. 1, but showing the parts in another position.

The vanes 15, projected out of the slots by the centrifugal force of the rotor rotation, and forced back into the slots by reason of their contact with the wall of chamber 30, move back and forth without difficulty or hindrance by reason of the oil in the bottoms of the slots, since, as already pointed out, the recess 35 in the plate 32 provides for inter-communication among the slots so that as oil is forced from one slot by movement thereinto of its vane, it flows into the bottom of a slot in which the vane is moving outwardly, with the respective oil flows balancing one another. The oil in the reservoir portion 18 of the housing 16 is moved by centrifugal force to a position spaced from the axis of the housing and along the interior surface thereof, substantially as shown in FIGS. 1, 4, and 5. The hydrostatic pressure in the oil 58 in the reservoir portion is a factor in the pressure of the oil in the pockets 31 and its rate of escape therefrom, and also in the flow of oil into pockets behind the vanes 15, it being appreciated that the rotor and vanes have a pumping action in ejecting oil from the pockets ahead of the vanes and in drawing oil into the pockets behind the vanes.

If the speed of the housing 16 should increase, as by reason of a decrease in the load thereon, the bell cranks 37 will be moved, by the increased centrifugal force, against the compression of spring 55 to bring the rollers 39 into positions along their arcs spaced a greater distance from the rotor 10 than the original balanced position, such as that shown in FIG. 1, at the predetermined rotational speed of the housing relative to the shaft 13. Such a radially outwardly located position of the bell crank arms 38 and rollers 39 is shown in FIG. 5. It will be evident that in this position of the bell cranks, the plate 32 is separated from the rotor 10 by a considerably greater distance than in the desired or adjusted position thereof such as shown in FIG. 1. This greater spacing of the adjustment plate from the rotor permits a greater and more rapid flow of oil 58 from the pockets 31 in advance of the vanes 15, so that the coupling force between the drive shaft and the housing 16 is decreased, or the relative slippage therebetween is increased, and the rotation of the housing 16 is correspondingly reduced. The reduction of the rotational speed of the driven member or housing 16 of course results in a decrease in the centrifugal force acting on the bell cranks 37, so that the force of the spring 55 returns them toward the desired position until the desired rotational speed of the housing 16 is reached.

It will be obvious that if the opposite circumstance should occur, that is, if due to increase in load or some other condition the speed of the housing 16 should decrease, the reduction in centrifugal force on the bell cranks would permit the spring 55 to swing the bell cranks to a position locating the rollers 39 thereof radially inwardly of the force-balanced positions at the original predetermined speed, and thus the plate 32 would be forced to a position closer to the rotor 10 and the space between these two parts further restricted to decrease the rate of escape of oil from the pockets 51 and thus result in a tighter coupling of the housing 16 to the shaft 13 so that more of the driving force would be applied to the housing and its speed would be brought to the desired level.

It will be apparent that the bearings 20 and 22, as well as the vanes 15 and bell cranks 37, are constantly lubricated by the oil 58, which bathes all of these parts, either as a result of centrifugal force or circulated thereabout by reason of the oil pressure resulting from the action of the rotor and its vanes previously referred to.

It should be noted that while the hand wheel 50 is provided for adjusting the compression of the spring 55, and thus controlling the speed of the housing 16 relative to that of the drive shaft, other means for shifting the control shaft 45 axially to control the spring compression may be employed. Thus, a camming or other arrangement might be employed for this purpose, which if desired might be positioned at a considerable distance from the drive mechanism, the construction disclosed readily lending itself to remote control.

Having thus described my invention, it will be obvious that various modifications may be made in the same without departing from the spirit of the invention; hence, I do not wish to be understood as limiting myself to the exact form, construction, arrangement, and combination of parts herein shown and described, or uses mentioned.

What I claim as new and desire to secure by Letters Patent is:

1. A variable speed drive comprising a drive shaft, a rotor secured on the drive shaft having a cylindrical portion with a plurality of radially inwardly extending slots formed in its periphery and opening through at least one face thereof, an impeller vane disposed in each of said slots projectable radially outwardly thereof, a housing rotatably mounted on the drive shaft having therein a generally elliptical chamber open at one side receiving said cylindrical rotor portion with a diameter of the cylindrical portion substantially coinciding with the minor axis of the chamber to divide the chamber into a pair of substantially identical pockets of crescent section defined between the cylindrical portion and the end surface portions of the chamber, said vanes engaging the chamber surface about the rotor throughout their rotation with the rotor, an adjustment plate in clearance relation with said housing adapted to close said open chamber side having a pilot bearing portion coaxial with and slidable in the cylindrical portion, said plate having one face opposed to said one face of the cylindrical portion and open chamber side, a recess in said one plate face communicating with said slots, an annular depression in the other face of the plate having a bottom arcuate in cross section, a control shaft coaxial with the drive shaft and annular depression and projecting out of the housing, a first spring seat secured on said control shaft, a second spring seat slidable on the control shaft, a spring compressible between said spring seats, a plurality of bell cranks spaced about the control shaft, each having one arm engaging said slidable spring seat and other engaging the bottom of said annular depression of the adjustment plate, means pivoting said bell cranks at points spaced radially inwardly of the axis of generation of said bottom, means threadably engaged with the outwardly projecting portion of the control shaft and bearing on the housing for longitudinally shifting the shaft to adjust the compression of said spring, and liquid in the housing filling said pockets and slots providing a driving connection between said drive shaft and housing.

2. A variable drive construction comprising a drive shaft, a rotor secured on said drive shaft having a plurality of peripheral slots therein extending radially inwardly, a radially outwardly projectable vane slidably disposed in each slot, a hollow driven member rotatably mounted on the drive shaft having therein a chamber open at one side receiving said rotor with one end face thereof substantially flush with said open chamber side and the other end face engaging with the other side of the chamber, said chamber including a surface surrounding the rotor peripherally and defining therewith a pair of generally crescent-shaped pockets, said vanes engaging said chamber surface substantially through their rotation with said rotor, a speed adjustment member in said hollow member having clearance relation therewith and a face engageable over said open chamber side in closing relation, means placing the inner portion of the slots in communication with each other, hydraulic fluid in said hollow member filling said slots and pockets, and means for adjustably positioning said adjustment member axially relative to said one rotor end face and open chamber side in response to rotational speed of the hollow member, said positioning means comprising an annular depression in the other face of said adjustment member having a cross-sectionally arcuate bottom surface, a plurality of levers pivotally mounted within said hollow member at points radially spaced from the generating axis of said bottom surface each having one end engaging the bottom surface, spring means engaging the other ends of said levers to bias said one end of each lever against the action of centrifugal force and in a direction urging the adjustment member toward the one rotor end face of said engagement with the bottom surface, and means for adjusting the biasing force of said spring means.

3. The construction substantially as defined in claim 2, in which said lever pivot points are spaced radially inward of said generating axis and said spring means bias said other lever ends radially outwardly.

4. The construction substantially as set forth in claim 2, in which said levers are bell cranks and said spring means urge said other ends thereof away from said one rotor end face.

5. The construction substantially as defined in claim 2, in which said spring bias adjusting means comprise a control shaft having a spring seat thereon and being shiftable axially away from said one rotor end face to compress the spring means between said spring seat and said other lever ends, and means operable exteriorly of the hollow member for determining the axial position of the control shaft.

6. The construction substantially as defined in claim 4, in which said spring bias adjusting means comprise a control shaft shiftable axially away from said one rotor end face, a first spring seat secured on said control shaft, a second spring seat slidable on the control shaft and engaging said other ends of said bell cranks, said first and second spring seats receiving the spring means therebetween, and means extending exteriorly of and engaging said hollow member having threaded engagement with the control shaft rotatable to determine the axial position thereof.

7. A variable drive construction comprising a drive shaft, a rotor secured on said drive shaft having a plurality of peripheral radially inwardly extending slots therein, a vane slidably disposed in each said slot projectable radially outwardly thereof, a hollow driven member rotatably mounted on said drive shaft having therein a generally elliptical chamber open at one side receiving said rotor with one end face thereof flush with said open side and with said vanes engaging the chamber wall to define between said wall and rotor a plurality of pockets at least some of which decrease in cross-sectional area in the direction of rotor rotation, an adjustment plate aligned with said rotor and hollow driven member disposed in clearance relation in said hollow member having a face of size and shape to close said open chamber side and disposed in opposed relation thereto, means placing the bottom portion of said slots in communication, a liquid in said hollow driven member filling said pockets and slots, means responsive to rotational speed of the driven member for adjustably positioning said plate axially relative to said rotor and face, comprising a camming surface extending annularly on the other face of said plate, a plurality of annularly spaced members pivotally mounted within the driven member each having an end engaging said cam surface, spring means biasing the lever members to swing in a direction effecting movement of the plate toward said rotor by engagement of said one end of each on the cam surface, comprising a spring seat on the control shaft, abutment means engaging the lever members and slidable relative to the control shaft, and a compression spring extending between said spring seat and abutment means, an axially shiftable control shaft engaged with said spring means, and means for axially adjusting the control shaft to vary the biasing force of the spring means on the levers.

References Cited in the file of this patent

UNITED STATES PATENTS

| | | |
|---|---|---|
| 1,099,509 | Nelson | June 9, 1914 |
| 1,565,355 | Farrell | Dec. 15, 1925 |
| 1,862,802 | Pope | June 14, 1932 |
| 2,240,662 | Montgomery | May 6, 1941 |
| 2,313,049 | Cook | Mar. 9, 1943 |
| 2,409,995 | Morton | Oct. 22, 1946 |
| 2,684,743 | Trofimov | July 27, 1954 |
| 2,792,095 | Sherman | May 14, 1957 |

FOREIGN PATENTS

| | | |
|---|---|---|
| 467,959 | Germany | Nov. 9, 1928 |
| 705,223 | France | Mar. 3, 1931 |